March 24, 1942.　　　J. C. GILBERT　　　2,277,317
TOBACCO HARVESTING DEVICE
Filed July 25, 1941　　　2 Sheets-Sheet 1

Inventor
JOHN CROCKET GILBERT,
By Clarence A. O'Brien
Attorney

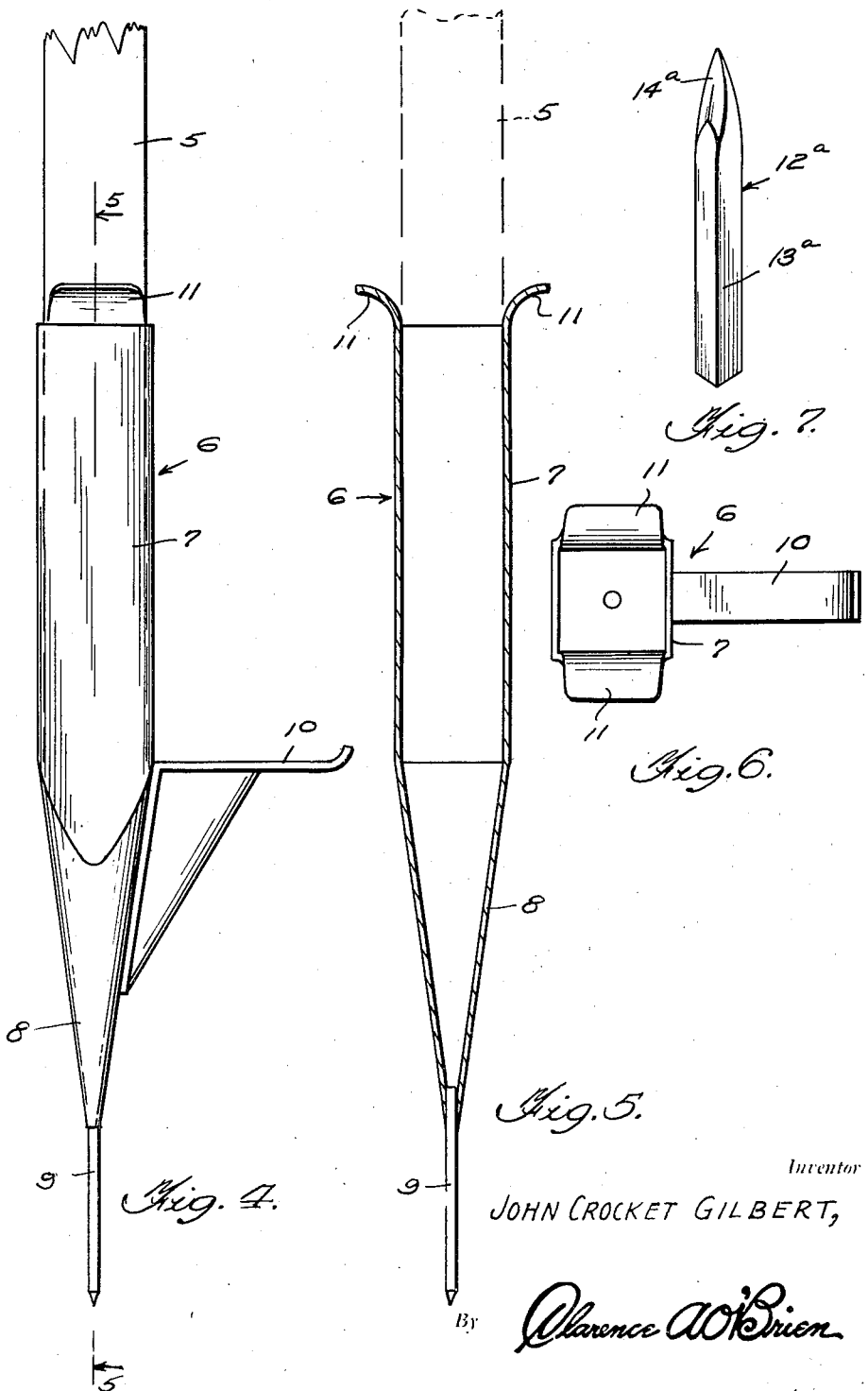

Patented Mar. 24, 1942

2,277,317

UNITED STATES PATENT OFFICE 2,277,317

TOBACCO HARVESTING DEVICE

John Crocket Gilbert, Buchanan, Va.

Application July 25, 1941, Serial No. 404,068

5 Claims. (Cl. 294—5.5)

This invention is a device particularly designed for use in harvesting tobacco, and by means of which tobacco plants can be easily and quickly strung on a lath or stick preparatory to hanging up in sheds to cure.

In accordance with the present invention there is provided a device which may be readily driven into the ground to extend upwardly at a desired angle to the perpendicular, and equipped with means for impaling the tobacco thereon as it is harvested, and the invention together with its objects and advantages will be best understood from a study of the following description taken in connection with the accompanying drawings wherein—

Figure 4 is an enlarged side elevational view of the lower or anchor-equipped end of the device.

Figure 5 is a longitudinal sectional view taken substantially on the line 5—5 of Figure 4.

Figure 6 is a top plan view of an anchoring socket forming part of the invention, and Figure 7 is a perspective view of a modified form of spear.

Figures 1, 2, 3:
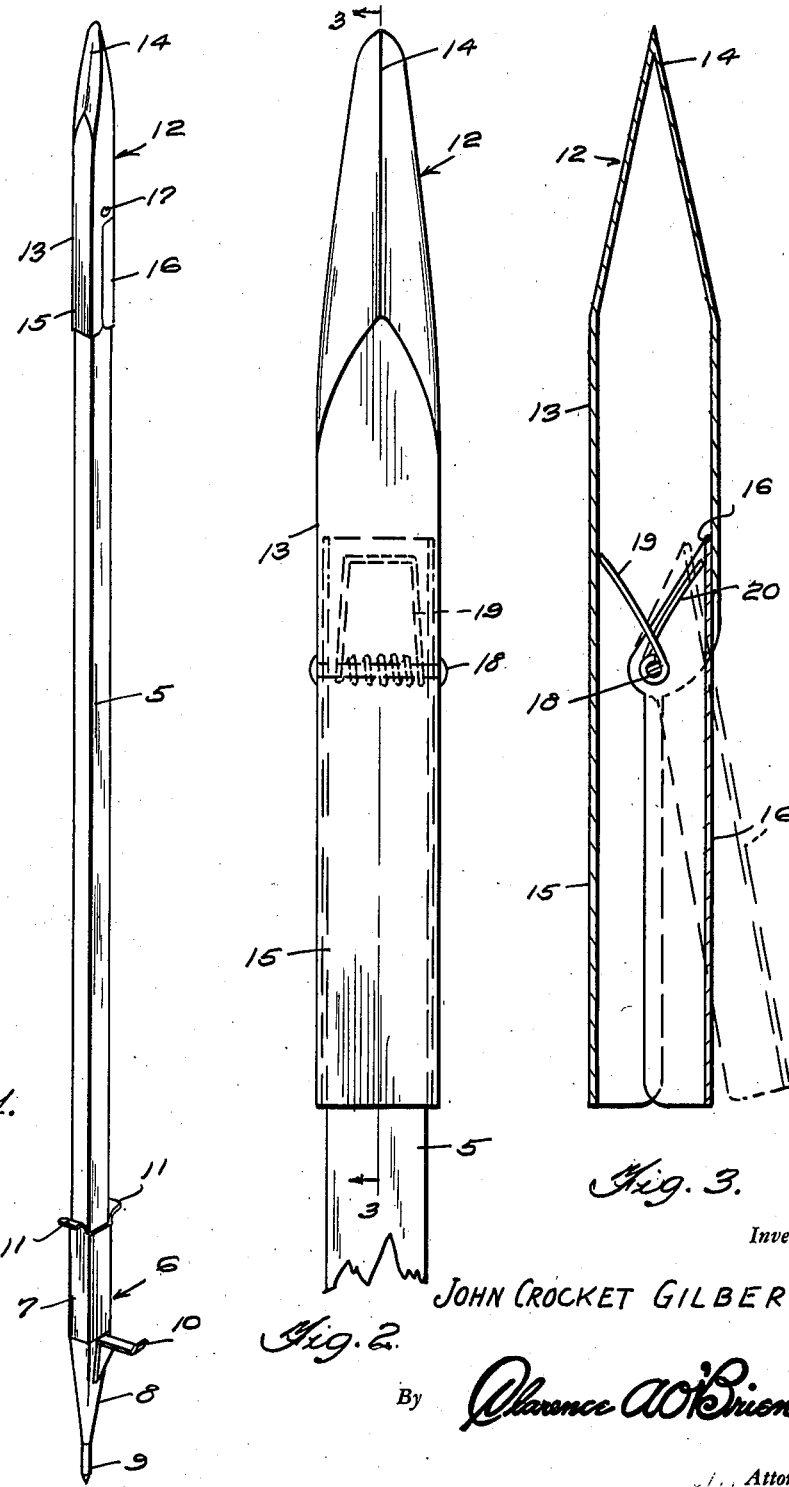
Figure 1 is a perspective view of a device embodying the features of the present invention.
Figure 2 is an enlarged side elevational view of the upper or spear-equipped end of the device.
Figure 3 is an enlarged longitudinal sectional view taken substantially on the line 3—3 of Figure 2.

Referring more in detail to the drawings it will be seen that 5 indicates a stick or lath of suitable length and cross-sectional shape and adapted to have impaled or strung thereon the tobacco plants as they are being harvested.

The reference numeral 6 indicates generally an anchoring socket for the stick 5.

The socket 6 may be formed of metal or other suitable material and embodies a socket portion 7 that receives therein, snugly, one end of the stick 5, and a tapered shank 8.

Extending from the shank 8 is a pilot point 9 and as will be readily apparent, the socket 6 is adapted to be forced bodily into the ground either perpendicularly, or at an angle to the perpendicular to secure the stick 5 either perpendicularly, or at an angle to the perpendicular for facilitating the impaling of the tobacco plants on said stick 5.

To facilitate the forcing of the anchoring socket 6 into the ground, the same is provided at the junction of the socket body 7 and taper 8 with a laterally extending rest or arm 10 upon which the foot may be placed for exerting pressure on the socket to force it into the ground.

At the open end thereof the socket body 7 is provided at diametrically opposite sides thereof with outwardly extending ears 11 that serve as stops and against which the first plant to be impaled on the stick abuts to limit further movement of the plant lengthwise of the stick 5.

For the free or impaling end of the stick 5 I provide a spear either such as shown in Figures 1 to 3, and indicated generally by the reference numeral 12, or as shown in Figure 7 and indicated generally by the reference numeral 12a.

The form of spear shown in Figures 1 to 3, inclusive, embodies a tubular body 13 that at one end tapers to a point as at 14.

The tubular body 13 is adapted to fit snugly on the end of the stick 5, and in this form of the invention, at the open end thereof, the tubular part 13 is divided longitudinally to provide an integral fixed jaw 15 and a movable or pivoted jaw 16 that at one end thereof is pivoted to the body 13 as at 17.

The pivot pin 17 extends transversely of the body 13 and has disposed thereon a coil spring 18 having integral therewith an abutment terminal 19 that bears against the jaw-equipped side 15 of the body 13, and an integral abutment terminal 20 that bears against an end 16a of the jaw 16, and which end 16a extends inwardly of the body 13 as shown in Figure 3. Thus it will be seen that the spring 18 serves to yieldably urge the jaw 16 to a closed position, which is the full line position shown in the drawings, and consequently the jaws 15 and 16 in cooperative clamping engagement with the stick 5 to positively secure the spear 12 on the upper or impaling end of the stick 5.

In the form of the invention shown in Figure 7 the spear 12a is formed of metal and embodies a tubular body 13a and an integral piercing point 14a.

The body 13a is adapted to be sleeved onto the free end of the stick 5 and differs from the form of spear 12 only in the absence of the coacting jaws 15 and 16 which characterize the form of spear 12.

It is believed that the manner of use of the device is, from the foregoing, clear to those skilled in the art, but may be briefly stated as follows: First the socket 6 is driven into the ground to the desired depth, after which one end of the stick 5 is inserted in the body 7 of the socket.

The selected form of spear, 12, 12a, is then placed on the upper end of the stick 5 whereupon the device is then ready to receive the harvested tobacco plants. The tobacco is placed on the device in an obvious manner, the stock of each plant being pierced by the spear 12 incidental to stringing the plant on the stick 5.

When the stick 5 has a sufficient number of plants strung thereon, it is then removed from the socket 6 and may be then used for hanging the tobacco in the curing barn, while a second stick is then substituted and with the selected form of spear 12, 12a, the operation just described is repeated.

It will also be appreciated that while the form of spear 12a is suitable for a stick of a determined diameter, the spear 12 may be used with sticks of various diameters, the jaws 15 and 16 readily accommodating the spear to a stick of large or small diameter as the case may be.

It is believed that the manner of use and advantages of a device of this character will be had by those skilled in the art without further detailed description.

It will also be understood that I do not wish to limit myself to the precise details of construction, combination and arrangements of parts as herein illustrated and described since I am aware that in practical fields of use minor changes may be required or desired. Therefore, what I desire to secure and protect by Letters Patent is:

1. A device for use in harvesting tobacco comprising an anchoring member in the form of a socket provided with a ground-penetrating point, an impaling stick having an end thereof fitting within said socket, and a tobacco plant impaling spear having a socket portion fitted on the free end of said stick.

2. A device for use in harvesting tobacco comprising an anchoring member in the form of a socket provided with a ground-penetrating point, an impaling stick having an end thereof fitting within said socket, and a tobacco plant impaling spear having a socket portion fitted on the free end of said stick, and said anchoring member having a member projecting laterally therefrom to provide a rest for the foot to facilitate forcing the penetrating point of the anchoring member into the ground at a desired angle to the perpendicular.

3. A device for use in harvesting tobacco comprising an anchoring member in the form of a socket provided with a ground-penetrating point, an impaling stick having an end thereof fitting within said socket, and a tobacco plant impaling spear having a socket portion fitted on the free end of said stick; and the body of said spear embodying an integral fixed jaw and a pivoted jaw coacting with the fixed jaw for positively securing the spear on the stick, and a spring device associated with the pivotal connection between said pivoted jaw and the body of said spear normally urging the pivoted jaw toward and into clamping relation with said fixed jaw.

4. In a tobacco harvesting device of the character described, a stick provided at one end thereof with means adapted to pierce the ground for supporting the stick at the desired angle to the perpendicular relative to the ground surface, and a tobacco impaling spear on the opposite end of said stick.

5. In a tobacco harvesting device of the character described, a stick, a socket member fitted on one end of the stick and provided with a ground-penetrating point and also with means projecting laterally from the socket to act as an abutment stop for plants impaled on said stick, and a plant impaling spear removably fitted on the opposite end of said stick.

JOHN CROCKET GILBERT.